United States Patent
Hauler et al.

(10) Patent No.: US 9,663,104 B2
(45) Date of Patent: May 30, 2017

(54) METHOD AND DEVICE FOR OPERATING A MOTOR VEHICLE IN AN AUTOMATED DRIVING MODE

(71) Applicant: Robert Bosch GmbH, Stuttgart (DE)

(72) Inventors: Florian Hauler, Linkenheim (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/902,404

(22) PCT Filed: Jun. 24, 2014

(86) PCT No.: PCT/EP2014/063242
§ 371 (c)(1),
(2) Date: Dec. 31, 2015

(87) PCT Pub. No.: WO2015/000739
PCT Pub. Date: Jan. 8, 2015

(65) Prior Publication Data
US 2016/0368491 A1    Dec. 22, 2016

(30) Foreign Application Priority Data
Jul. 4, 2013   (DE) .......... 10 2013 213 171

(51) Int. Cl.
*B60W 30/09*   (2012.01)
*B60W 10/18*   (2012.01)
(Continued)

(52) U.S. Cl.
CPC ............. *B60W 30/09* (2013.01); *B60T 7/22* (2013.01); *B60W 10/18* (2013.01); *B60W 10/20* (2013.01);
(Continued)

(58) Field of Classification Search
CPC ..... B62D 15/025; B62D 15/0255; B60T 7/22; B60T 2201/022; B60T 2201/024; B60W 30/085
See application file for complete search history.

(56) References Cited

U.S. PATENT DOCUMENTS

| 8,670,903 B2 | 3/2014 | Lee et al. |
| 2012/0083959 A1 | 4/2012 | Dolgov et al. |
| 2015/0012166 A1* | 1/2015 | Hauler ................ G05D 1/0212 701/23 |

FOREIGN PATENT DOCUMENTS

| DE | 101 44 797 | 3/2003 |
| DE | 10 2011 086241 | 5/2013 |

(Continued)

OTHER PUBLICATIONS

International Search Report for PCT/EP2014/063242, dated Oct. 9, 2014.

*Primary Examiner* — Richard Camby
(74) *Attorney, Agent, or Firm* — Gerard Messina

(57) ABSTRACT

In a method for automated driving operation of a motor vehicle, the following are performed: a standard trajectory is ascertained, which implements a vehicle control according to the destination setting predefined by the driver and the current vehicle environment; a safety trajectory is ascertained, which implements safe stopping of the vehicle in the event of an emergency as a function of the current vehicle environment; the standard trajectory is supplied to a first control device, by which signals are forwarded to vehicle actuator devices for control of the vehicle on the basis of the standard trajectory; and the safety trajectory is supplied to a second control device, by which signals are able to be forwarded to vehicle actuator devices for the vehicle control on the basis of the safety trajectory in the safety case when the automated driving operation is not ensured.

12 Claims, 2 Drawing Sheets

(51) Int. Cl.
*B60W 10/20* (2006.01)
*B60W 30/08* (2012.01)
*B62D 15/02* (2006.01)
*B60T 7/22* (2006.01)
*B60W 30/085* (2012.01)

(52) U.S. Cl.
CPC .......... *B60W 30/08* (2013.01); *B60W 30/085* (2013.01); *B62D 15/025* (2013.01); *B62D 15/0255* (2013.01); *B60T 2201/022* (2013.01); *B60T 2201/024* (2013.01)

(56) References Cited

FOREIGN PATENT DOCUMENTS

| | | |
|---|---|---|
| JP | H04372470 A | 12/1992 |
| JP | H09161196 A | 6/1997 |
| JP | 2001138882 A | 5/2001 |
| JP | 2003015741 A | 1/2003 |
| JP | 2003063373 A | 3/2003 |
| JP | 2009149208 A | 7/2009 |
| WO | WO 2013/074034 | 5/2013 |

* cited by examiner

METHOD AND DEVICE FOR OPERATING A MOTOR VEHICLE IN AN AUTOMATED DRIVING MODE

BACKGROUND OF THE INVENTION

1. Field of the Invention

The present invention relates to a method and a device for operating a motor vehicle in an automated driving mode, in which a standard trajectory is ascertained which implements a vehicle control according to the destination setting specified by the driver and the current environment situation, and a safety trajectory is ascertained which implements safe stopping of the vehicle in the event of an emergency as a function of the current vehicle environment situation, the standard trajectory being forwarded to a first control device and the safety trajectory being forwarded to a second control device, and the actuator devices for the vehicle control are actuated by the first control device in the standard operation, and in the safety situation, when the automated driving operation cannot be ensured, the actuator devices are actuated by the second control device in order to stop the vehicle without danger.

2. Description of the Related Art

A computer unit and an associated method for safely shutting off of a vehicle is known from the published German patent application document DE 10 2011 086 241 A1; here, it is checked whether an emergency situation is at hand, and if an emergency situation has been detected, a driver assistance system guides the vehicle to the side of a road in that information is queried from an external data base and taken into account by the driver assistance system.

BRIEF SUMMARY OF THE INVENTION

The core of the present invention is to provide a method and an associated system, which is able to guide a vehicle in an automatic manner and which is furthermore able to detect whether an emergency situation is at hand, in which the vehicle is no longer controllable automatically; the method and the system are developed in such a way that the vehicle is safely able to be stopped in such an emergency situation, without endangering the vehicle occupants or other road users.

According to the present invention, the described objective is achieved in that a trajectory planning module ascertains a standard trajectory and a safety trajectory. The standard trajectory describes the planned travel route of the vehicle within the framework of a travel route lying directly ahead, so that the vehicle is moved to a destination previously input by the driver. The safety trajectory relates to the travel route of the vehicle situated directly ahead, which is advantageously to be adopted in the event of an emergency situation in which the vehicle is no longer operable automatically, and it concerns safe parking of the vehicle at the closest suitable stopping position. The standard trajectory is forwarded to a first control device where signals for actuator devices of the vehicles are ascertained on the basis of the standard trajectory and output to downstream actuator devices. These actuator devices relate both to the vehicle's linear control, i.e., the control of the speed and acceleration of the vehicle in the driving direction, and to the vehicle's lateral control, i.e., the actuation of steering actuators for influencing the vehicle in its direction and for keeping it on the currently used traffic lane or for executing selective changes in direction. In the present invention the term acceleration is used to denote both positive and negative acceleration values and therefore also includes decelerations. The safety trajectory calculated in parallel in the normal driving mode is forwarded to a second control device, which uses this safety trajectory to also ascertain signals for downstream actuator devices. However, the second control device refrains from forwarding these signals for downstream actuator devices that are based on the safety trajectory to the downstream actuators for as long as the vehicle is controllable in an automated driving mode.

The stopping of the vehicle advantageously takes place with the aid of the safety trajectory that was forwarded to the second control device. It is especially advantageous here that when the safety case arises, i.e., the situation where the vehicle must be stopped using the safety trajectory, the safety trajectory has already been stored in the second control device and a switchover to the safety operation is therefore able to take place without a time delay.

It is furthermore advantageous that the actuator devices of the vehicle are actuable by the first control device or by the second control device for influencing the linear and lateral dynamics of the vehicle. Actuators for influencing the vehicle's linear dynamics are devices which are able to vary the vehicle speed and the vehicle acceleration, and devices for influencing the vehicle's lateral dynamics are devices which can actuate the vehicle steering in order to selectively control the vehicle in its driving direction. The linear dynamics actuator system of the vehicle, which is actuable by the first control device or the second control device, may be separate actuators, which are able, separately of each other, to vary the linear vehicle dynamics, i.e., the speed, acceleration or deceleration, using separate devices. It is furthermore conceivable that the actuator system that is actuable by the first control device and the second control device is made up of a single actuator which, however, has two inputs that are separate from each other, so that if the one signal path of the actuator malfunctions, the actuator retains its unrestricted functionality via the second signal path. For example, such an actuator system is implementable by using electric motors having double-layer windings or separate electric motors, in which one motor remains in the freewheeling state for as long as the other motor varies the setting of the actuator.

It is furthermore advantageous that the first control device operates independently of the second control device. This may be done by providing two autonomous and mutually independent devices. However, it is also possible to use a shared housing, in which two control device switching circuits are accommodated, which are separate from each other. In this context it is also important that the supply lines as well as the input and output signal lines for the two control devices are separated and do not access shared resources.

It is furthermore advantageous that the communications devices between the first control device and the actuator devices for the vehicle control are independent of the communications devices between the second control device and the actuator devices for the vehicle control. Not only will the calculation of the control signals for the actuator system be independent of each other in this way, but a redundancy for the transmission paths for these signals is provided as well, and in the event that cable damage occurs or that not only one control device but a whole group of control devices malfunctions, a reliable operating mode of an automatically operated vehicle can therefore be ensured nevertheless.

It is especially advantageous if the first control device and the second control device are connected to separate supply networks, so that a safe driving operation, at least to the next emergency stop position, is possible even if the energy supply fails.

It is moreover advantageous that in addition to the environment sensor system, which is provided for the automated driving operation in a normal mode, a further environment sensor or multiple further environment sensors is/are provided, whose signals are not required for the vehicle control in a normal driving mode. This further environment sensor or the further environment sensors is/are devices that are able to detect an imminent collision with an object in the vehicle environment and supply these signals directly to the second control device, which brings the vehicle to a stop at the closest stopping position in the event of a safety situation. In case of need, an automatic emergency braking operation in the emergency stopping mode is thereby possible based on the information supplied by the further environment sensor or the multiple further environment sensors, so that a collision of the vehicle in the emergency operating mode is avoided or the collision consequences of a no longer avoidable collision are at least mitigated. This further environment sensor or these multiple further environment sensors, for example, may be sensor systems on the basis of lidar sensors, radar sensors, ultrasonic sensors, video or stereo video sensors.

Of particular importance is the realization of the inventive method in the form of a control element, which is provided for a control unit of an automatic control system for a motor vehicle. Stored on the control element is a program which is able to run on a computer device, in particular on a microprocessor or signal processor, and which is suitable for executing the method of the present invention. In this case, the present invention is therefore realized by a program stored on the control element, so that this control element provided with the program constitutes the present invention in the same way as the method for whose execution the program is suitable. In particular an electric storage medium, such as a read-only memory, may be used as control element.

Further features, application options and advantages of the present invention result from the following description of exemplary embodiments of the invention, which are shown in the figures of the drawing. All described and illustrated features constitute the subject matter of the present invention, by themselves or in any combination, regardless of their combination in the patent claims or their antecedent reference and regardless of their wording or representation in the description or in the figures.

DETAILED DESCRIPTION OF THE INVENTION

Figure 1:
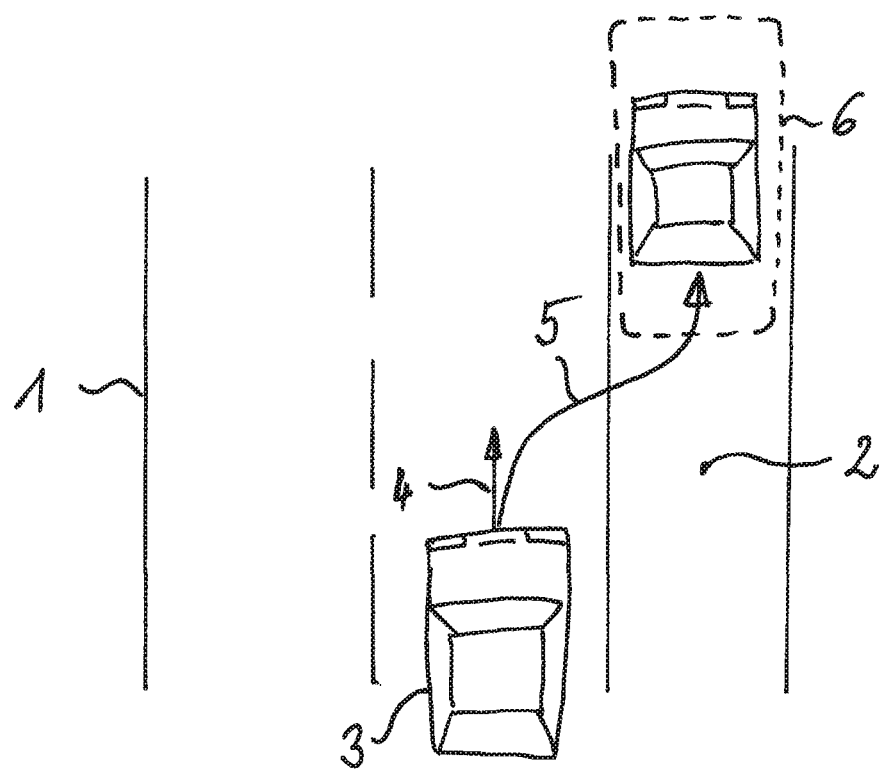
FIG. 1 shows a basic representation of an automated motor vehicle according to the present invention, in a regular mode and in a fault case.

FIG. 1 shows a roadway 1, on which a vehicle 3 is traveling. Vehicle 3 is able to travel autonomously in an automated driving mode. Once the driver has input a destination, a trajectory is calculated piece by piece, on whose basis control commands for the actuator system of the vehicle are ascertained. For the locomotion of vehicle 3 in a normal operating mode of the automated driving operation, a trajectory 4 has been ascertained that guides the vehicle along roadway 1 and roughly corresponds to straight-ahead travel in the example of the illustrated section. At the same time, it is recognized with the aid of the environment sensor system provided in the vehicle that a safe stopping area 2 exists on the right side adjacent to roadway 1. This stopping area 2, for example may be a break-down lane on a super-highway or on a state highway resembling a super-highway, but it may also be an emergency stopping area, a paved roadway shoulder, a parking spot, for instance oriented parallel to the driving direction, or a side road. Simultaneously with ascertaining a standard trajectory 4, a safety trajectory 5 is continuously ascertained as well. This safety trajectory 5 is created in that the environment sensor system in conjunction with the locating system, which ascertains the own position using highly precise map information, searches for the next possible safe stopping area 2 and ascertains an alternative trajectory, i.e., safety trajectory 5, which relates to bringing vehicle 3 from the current position to a stopping position 6. If it is determined in the further driving operation that vehicle 3 is no longer permanently operable along trajectory 4 in an automated driving mode, then the vehicle control switches over to an emergency operation and vehicle 3 is guided to next stopping position 6 along safety trajectory 5, where the vehicle is automatically brought to a safe standstill. This emergency operation may be the result of a failure of a system component for the automated driving, but it is also conceivable that a remote vehicle component fails and causes part of the on-board electrical system to be switched off, or that further driving in an automated mode is no longer possible because of an especially complex environment situation or because of a lack of data required for the operation.

Figure 2:
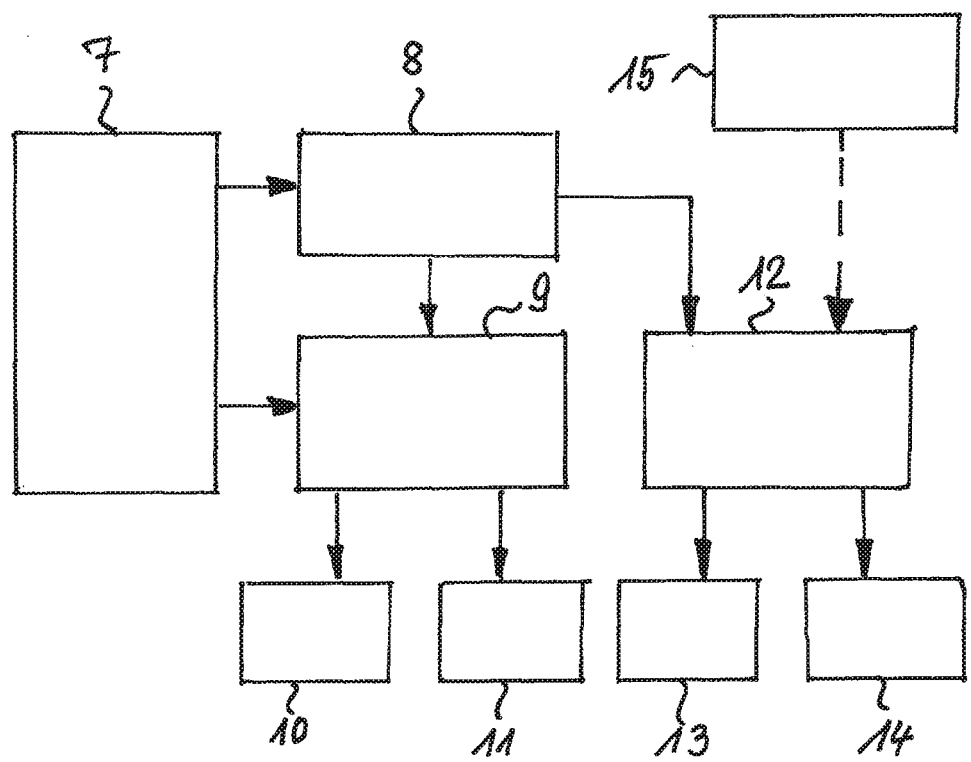
FIG. 2 shows a basic block circuit diagram of one specific embodiment of the device of the present invention.

FIG. 2 shows how a described system for an automated vehicle operation and for the automated safe stopping of vehicle 3 may be designed. For example, module 7 is shown, which includes a position determiner, a route planner and an environment sensor system. This module 7 ascertains the current position of vehicle 3, determines a scheduled travel route based on the current position and the input destination, by accessing map data that are stored on or loaded from an external data server, and by transmitting this route information to a trajectory planning module 8 and a first control device 9. Furthermore, vehicle 3 is equipped with an environment sensor system, which detects objects in the vehicle environment and makes positional and movement data of these objects available. These objects in the vehicle environment may be further road users, but also stationary objects such as trees, signs, bridges or house walls. In addition, the environment sensor system is able to detect free spaces where the vehicle can drive and which are utilized for planning the trajectory. These object data regarding objects and free spaces in the vehicle environment are likewise forwarded by module 7 to trajectory planning module 8 and to first control device 9. Based on the supplied route data and object data, a standard trajectory 4 is now ascertained in trajectory planning module 8, which relates to a scheduled movement of vehicle 3 in the linear and lateral directions for a partial route section lying ahead and takes into account the geographical circumstances and the currently existing object situation. Furthermore, trajectory planning module 8 continuously ascertains a safety trajectory 5, for whose ascertainment the next suitable stopping position 6 is determined and the vehicle locomotion of vehicle 3 is planned in advance in such a way that vehicle 3 is able to be brought to a safe standstill at this stopping position 6. Trajectory planning module 8 forwards this safety trajectory 5 to second control device 12, which is set up in parallel with and redundantly from first control device 9. Using standard trajectory 4 supplied by trajectory planning module 8, it is determined in first control device 9 when and to what extent actuators must be actuated in order to guide vehicle 3 along the previously calculated standard trajectory 4. Ascertaining these signals for actuator devices requires exact knowledge of the current location, so that the position ascertainment module and the route planning module as well as environment sensor system 7 supply the positional information in addition.

First control device 9 now calculates signals on the basis of which the drive devices and deceleration devices of the vehicle must be controlled in order to implement the precalculated linear dynamics of the vehicle. At the same time it is ascertained which particular steering motions the steering actuator system must execute in order to guide vehicle 3 along standard trajectory 4. The downstream linear actuator 10, which may alternatively also be made up of multiple individual actuators, converts the control commands for the linear dynamics of vehicle 3 into speeds, accelerations, including decelerations, as well as variations of the transmission ratio, so that vehicle 3 is guided according to standard trajectory 4. In the same way, lateral actuator 11 converts the control signals, received from first control device 9, for the lateral dynamics of the vehicle into steering motions, so that vehicle 3 is guided along standard trajectory 4 in an interaction with the lateral dynamics. Safety trajectory 5, supplied to second control device 12, is likewise converted into control signals for linear actuators 13 and lateral actuators 14, but these control signals for actuators are not output or processed further in a normal operating mode.

If it is determined in vehicle 3 that the automated driving mode cannot be maintained, for instance because one of the components required for this purpose is not available or because some other interruption in the automated vehicle operation exists, then the output of the control signals in real time for actuator devices from first control device 9 is switched over to the output of the control signals for actuator devices in second control device 12, so that vehicle 3 is able to be brought to a safe standstill at the closest stopping point 6 without time delay according to the precalculated safety trajectory 5. Redundant linear actuator 13, which may alternatively also be made up of multiple actuators for the engine control, brake control and transmission control, may be developed in parallel with and independent of the linear actuator or the plurality of linear actuators 10 for the engine control, brake control and transmission control, so that each of the two linear actuators 10, 13 is able to control the linear actuators independently of the respective other. To avoid malfunctions, it is merely necessary to ensure that either linear actuator 10 or linear actuator 13 implements control signals to the actuators at the same time. The two linear actuators 10, 13 may also be realized in the form of a single actuator, but it will then be necessary for this shared linear actuator to have two separate input circuits and control systems which are able to influence the actuator by themselves and independently of each other. For example, this may be realized by double-layer windings in electromagnetic drive devices. The same redundancy as described with regard to linear actuators 10 and 13 applies in the same way to the lateral actuator system of block circuit symbols 11 and 14.

Moreover, a further environment sensor 15 may optionally be provided, which alternatively may also be an environment sensor system made up of a plurality of individual sensors. It has the task of scanning the vehicle environment lying immediately ahead with regard to objects that are present and for ensuring that no collision with another object takes place during the emergency operation, i.e., during the time period in which vehicle 3 is guided to stopping position 6 along safety trajectory 5 in a controlled and safe manner. In particular another road user or a stationary object is considered an object. If optional additional environment sensor 15 detects an object that is located ahead in the area of safety trajectory 5, then this further additional environment sensor 15 is able to trigger an automatically initiated and implemented emergency braking operation in order to avoid the imminent collision or at least to mitigate the collision consequences in the event of an unavoidable collision. Since this additional environment sensor system 15 is required only for the emergency operating mode, i.e., while traveling along safety trajectory 15, it is recommended to use a cost-effective yet robust sensor type for this purpose, for instance a lidar sensor or an ultrasonic sensor as it is basically known from parking systems. However, other sensor types, e.g., a stereo video camera which has its own redundancy because of its two cameras, may be used just as well, as are radar sensors or other object detection technologies.

What is claimed is:

1. A method for operating a motor vehicle in an automated driving mode, comprising:
   ascertaining a standard trajectory, which implements a vehicle control according to the destination setting specified by the driver and the current vehicle environment situation;
   ascertaining a safety trajectory, which realizes safe stopping of the vehicle in the event of an emergency as a function of the current vehicle environment situation;
   supplying the standard trajectory to a first control device, by which signals are able to be forwarded to actuator devices of the vehicle for the vehicle control on the basis of the standard trajectory; and
   supplying the safety trajectory to a second control device, by which signals are able to be forwarded to actuator devices of the vehicle for the vehicle control on the basis of the safety trajectory;
   wherein (i) in a standard operating mode, the actuator devices for the vehicle control are actuated by the first control device, and (ii) in a safety mode corresponding to a safety case, when the automated driving mode is unable to be ensured, the actuator devices are actuated by the second control device in order to stop the vehicle without danger.

2. The method as recited in claim 1, wherein the stopping of the vehicle takes place with the aid of the safety trajectory which has already been supplied to the second control device when the safety case occurs.

3. The method as recited in claim 1, wherein the actuator devices of the vehicle are able to be selectively actuated by one of the first control device or by the second control device for influencing the linear vehicle dynamics and the lateral vehicle dynamics.

4. The method as recited in claim 1, wherein the first control device operates independently of the second control device.

5. The method as recited in claim 4, wherein the energy supply of the first control device is independent of the energy supply of the second control device.

6. The method as recited in claim 1, wherein at least one communications device linking the first control device and the actuator devices for the vehicle control is independent of at least one communications device linking the second control device and the actuator devices for the vehicle control.

7. The method as recited in claim 1, wherein in the safety case, by which an emergency braking functionality is implemented based on at least one signal from an environmental sensor in order to one of avoid a collision or mitigate consequences of a collision.

8. A device for operating a motor vehicle in an automated driving mode, comprising:
- a sensor device;
- an ascertainment device for trajectory planning;
- a first control device configured to forward signals to actuator devices of the vehicle for vehicle control on the basis of a standard trajectory, which implements a vehicle control according to the destination setting specified by the driver and the current vehicle environment situation;
- a second control device configured to forward signals to actuator devices of the vehicle for vehicle control on the basis of a safety trajectory, which realizes safe stopping of the vehicle in the event of an emergency as a function of the current vehicle environment situation; and
- a fault monitoring device configured to detect a safety case in which the automated driving operation is not ensurable, wherein in the safety case, the actuator devices are no longer actuated by the first control device, but are actuated by the second control device so that the vehicle is able to be stopped without danger.

9. The device as recited in claim 8, wherein the first control device is independent of the second control device.

10. The device as recited in claim 9, wherein the energy supply to which the first control device is connected is independent of the energy supply to which the second control device is connected.

11. The device as recited in claim 9, wherein at least one signal from at least one environment sensor is forwarded to the second control device.

12. The device as recited in claim 11, wherein the at least one signal from the at least one environment sensor is used in the second control device for operating an emergency braking functionality in order to one of avoid a collision in the safety case or mitigate consequences of a collision.

* * * * *